Patented July 11, 1933

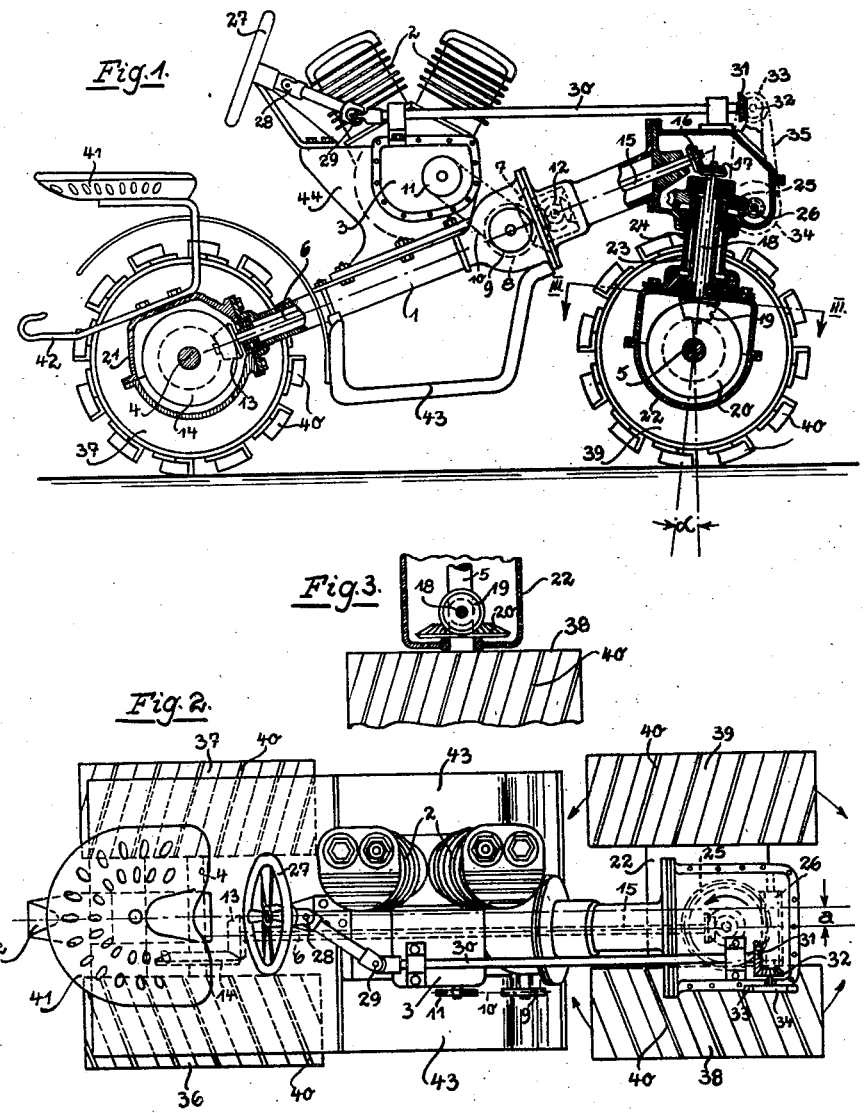

1,918,221

UNITED STATES PATENT OFFICE

ANTON WEBER AND LUDWIG WEBER, OF KREUZNACH, GERMANY

TRACTOR

Application filed April 29, 1932, Serial No. 608,230, and in Germany May 23, 1931.

The invention relates to motor vehicles, and more particularly to tractors provided with a steerable, front-wheel construction, rotatably mounted with relation to the machine frame by means of a pivot pin carrying the front axle, which is engine-driven by means of a driving shaft guided in said pivot pin.

An object of the invention is to provide an improved tractor the construction of which lends itself to easy steering.

A further object is to simplify the construction of tractors of the above-described character, to improve their efficiency and reduce their cost of manufacture.

Other and further objects will be explained hereinafter and will be particularly pointed out in the appended claims.

Vehicles with driving shaft extending through the pivot pin of the steerable front axle have the tendency to run in a circle in the direction of rotation of this shaft and are difficult to steer in the opposite direction.

According to a feature of the present invention, the driving shaft which drives the front axle and the hollow pivot pin carrying same are so supported on the front axle as to be disposed slightly non-vertical, in a longitudinal, vertical plane to one side of the longitudinal, central plane of the vehicle, towards the side tending to move ahead when running in forward direction. Preferably, if the rear axle and the front steering axle are engine-driven, through the medium of a main driving shaft situated in the longitudinal direction of the vehicle, and geared directly to the rear axle and to the upper end of the intermediate shaft driving the front axle, the whole of the machine frame is supported on both axles to one side of the said vertical central plane, towards the side of the front axle tending to move ahead when running in forward direction. Owing to the unequal leverage and the different loading of the front wheels—the wheel on the side tending to move ahead being located at the shorter end of the axle and being more heavily loaded—the effect of the turning movement of the driving shaft is almost, or if the load is properly distributed, completely, neutralized, as the tendency to move ahead of the one wheel is opposed by the greater surface friction and surface pressure. This arrangement can be employed without impairing the stability and the position of the vehicle on the ground and renders unnecessary special auxiliary steering means, such as are provided on similar vehicles.

An embodiment of the invention is illustrated by way of example in the accompanying drawing in which:

Fig. 1 shows the vehicle in side elevation, partly in section.

Fig. 2 is a top plan view of the vehicle.

Fig. 3 is a part section on line III—III of Fig. 1.

The tractor consists substantially of a tubular frame 1 accommodating the driving mechanism, an engine 2 and gear box 3 mounted on this frame, a stationary rear axle 4 and a steerable front axle 5. In the tubular frame 1 a driving shaft 6 is journaled which is rotated from the gearing 3 through the intermediary of a pair of bevel gears 7, 8 and chain drive 9, 10, 11. The driving shaft 6 which is coupled to a shaft 15 by a differential gear 12 drives the rear axle 4 at one end through the intermediary of bevel wheels 13, 14. The shaft 15 rotates the intermediary shaft 18 by means of a pair of bevel wheels 16, 17 and the front axle 5 through the intermediary of a pair of bevel wheels 19, 20. The rear axle 4 is journalled in an axle box 21 rigidly connected to the tubular frame 1. An axle box 22 accommodating the steerable front axle 5 carries a hollow pivot pin 23 extending through a collar 24 arranged on the frame 1. The intermediate shaft 18 is journaled in the hollow pivot pin 23. This pin carries on its upper end a worm wheel 25 which meshes with a worm 26. The steering of the front axle is effected by a hand wheel 27, the movement of which is transmitted by two universal joints 28, 29 to a steering shaft 30 and from the same by a pair of bevel wheels 31, 32, sprocket wheels 33, 34 and a chain 35 to the worm 26. The running wheels 36, 37, 38 and 39 rigidly mounted on the axles 4 and 5 are provided with caulks 40 which can be exchanged for rubber tires for travelling on roads. A driver's seat 41 is arranged directly on the rear axle box and carries a hitch hook 42 or other suitable connecting device. The operating elements for the engine, the gearing and the brake, are arranged easily accessible on the hand wheel 27, the foot rests 43, supporting block 44 for the engine or at some other suitable place. The steerable front axle can be oscillated in both directions through 90° (Fig. 2).

The pivot pin 23 of the front axle is inclined in the vertical plane imagined through the driving shaft 6 out of the perpendicular by an angle α.

For equalizing the turning moment imparted to the front axle 5 by the rotation of the intermediate shaft 18, which turning moment tends to oscillate this axle in the sense of rotation of the intermediate shaft 18, the tubular frame 1 accommodating the driving shaft 6 and all the remaining driving parts is shifted out of, or to one side of, the central line of the vehicle a distance $a$ towards the side of the front axle 5 tending to move ahead when running in forward direction. As clearly shown in Fig. 2, the end of the front axle carrying the front wheel 38 is shorter than the other end carrying the wheel 39. The running wheels 36, 38 are more heavily loaded than the wheels 37, 39 on the opposite side of the machine. The result is that the tendency of the front wheel 38 situated on this side to travel ahead of the other front wheel 39 or the tendency of the latter to lag behind is neutralized. This displacement of the centre of gravity has no effect on the stability and position on the ground and renders special auxiliary steering arrangements unnecessary.

We claim:

1. A motor vehicle comprising, in combination with the machine frame, a hollow pivot pin, a front axle rotatably mounted on said pivot pin, a driving shaft situated in said pivot pin and geared to the front axle, front wheels on both ends of the front axle and rigidly connected to same, said pivot pin and said driving shaft being supported on the front axle to one side of the middle of the same.

2. A motor vehicle comprising, in combination, a frame, a rear axle journaled in said frame, a member pivotally mounted on the frame so as to pivot about an axis disposed in substantially a vertical longitudinal plane through the frame to one side of the vertical plane through the middle of the frame, a front axle journaled in the member, rear wheels at the ends of the rear axle, front wheels at the ends of the front axle at different distances from said axis, a driving shaft geared to the front axle and rotatable about said axis, and means for turning the member about the said axis to steer the tractor.

3. A tractor comprising, in combination with the machine frame, a hollow pivot pin, a front axle rotatably mounted on said pivot pin, a main driven shaft on said frame, means driving said shaft, an intermediary shaft situated in said hollow pivot pin and geared to said main driving shaft and said front axle, and front wheels on both ends of said front axle and rigidly connected to same, said pivot pin and said intermediate shaft supported to one side of the middle of the front axle toward the side tending to move ahead when running in forward direction.

4. A tractor comprising, in combination with the machine frame, a main driving shaft disposed longitudinally on said frame, means driving said shaft, a rear axle geared to said main driving shaft, a hollow pivot pin, a front axle rotatably mounted on said pivot pin, an intermediary shaft situated in said hollow pivot pin and geared to said main driving shaft and the front axle, and front wheels on said front axle and rigidly connected to same, said pivot pin and intermediate shaft as well as the main driving shaft situated to one side of the middle of the front axle and the rear axle respectively toward the side of the front axle tending to move ahead when running in forward direction.

5. A tractor comprising, in combination, a frame, a rear axle journaled in said frame, a member pivotally mounted on the frame so as to pivot about an axis disposed in substantially a vertical longitudinal plane through the frame to one side of the vertical plane through the middle of the frame, a front axle journaled in the member, rear wheels at the ends of the rear axle, front wheels at the ends of the front axle at different distances from said axis, a driving shaft disposed longitudinally of the frame, and intermediate shaft geared to the front axle and rotatable about said axis, gearing connecting the driving shaft with the rear axle and with the intermediate shaft, and means for turning the intermediate shaft to steer the tractor.

6. A tractor comprising, in combination, a frame, a rear axle journaled in said frame, a member pivotally mounted on the frame so as to pivot about an axis disposed in substantially a vertical longitudinal plane through the frame to one side of the vertical plane through the middle of the frame, the axis being inclined in a forward direction, a front axle journaled in the member, rear wheels at the ends of the rear axle, front wheels at the ends of the front axle at different distances from said axis, a driving shaft disposed longitudinally of the frame in the first-named plane, an intermediate shaft geared to the front axle and rotatable about said axis, gearing connecting the driving shaft with the rear axle and with the intermediate shaft, and means for turning the intermediate shaft to steer the tractor.

In testimony whereof we affix our signatures.

ANTON WEBER.
LUDWIG WEBER.